INVENTOR.
Earl A. Thompson,

BY
ATTORNEY.

Patented Nov. 14, 1922.

1,435,430

UNITED STATES PATENT OFFICE.

EARL A. THOMPSON, OF PORTLAND, OREGON.

AUTOMATIC GEAR-SHIFTING MECHANISM FOR SLIDING GEAR TRANSMISSION.

Application filed March 9, 1918. Serial No. 221,412.

*To all whom it may concern:*

Be it known that I, EARL A. THOMPSON, a citizen of the United States, residing in the city of Portland, county of Multnomah, and State of Oregon, have invented certain new and useful Improvements in Automatic Gear-Shifting Mechanisms for Sliding Gear Transmission, of which the following is a specification.

My invention relates to automatic gear-shifting means, and has among its salient objects to provide in combination with transmission gears adapted to be moved into and out of mesh with each other while they are turning, means for synchronizing the pitch line velocity of said gears, whereby to make it possible to easily move them into mesh with each other without gear clash; to provide in combination therewith a synchronizing mechanism adapted to be operated by the movement of the vehicle on which it is mounted; to provide in a mechanism of the character referred to a gear selecting mechanism for determining at will which of the transmission gears are to be moved into mesh with each other and on which the synchronizing mechanism is to operate. before they are so moved; to provide in a mechanism of the character referred to a controlling member with connections for operating said mechanisms in proper sequence quickly and with ease.

My invention as I have worked it out and actually constructed it comprises, in combination with the usual clutch and transmission mechanisms of a motor car, a selector mechanism and a synchronizing mechanism. The selector mechanism has an indicating and operating member adapted to indicate the different speed connections possible, and when moved for this purpose, it also sets other mechanisms for moving the transmission gears, and the mechanisms for operating the synchronizer. The synchronizing mechanism is arranged to be driven by the movement of the vehicle on which it is mounted, and to impart to certain of the transmission gears a pitch line velocity substantially the same as the pitch line velocity of another transmission gear which is being driven by the movement of the vehicle and with which it is to be put into mesh, thus making it possible to move these gears into mesh with each other while they are turning without gear clash, because their speeds have first been coordinated.

I have connected the gear moving mechanism and the mechanism for controlling the operation of the synchronizing mechanism with the clutch operating member, whereby the simple movement of the clutch pedal, for example, not only disengages the clutch, but also disengages the transmission gears which are in mesh with each other, causes the synchronizing mechanism to operate to coordinate the speeds of the gears previously selected to be put into mesh with each other, and also sets for action means for moving the selected gears into mesh with each other as the clutch pedal returns and the clutch again engages. The gear selecting mechanism can be set at any time independently of anything and without interfering with the driving connections already operating. In other words, it is only necessary, at any time before a change of gears may be necessary, to move the small selector member to the desired transmission connection—low, intermediate, or high—and when ready for the change, no matter at what speed you are traveling, to push in the clutch pedal and let it return and the entire change or shifting of the gears is accomplished. Hand-operated transmission levers are done away with and the matter of shifting gears is made absolutely automatic by simply depressing the clutch pedal and allowing it to return.

In order to more fully explain my invention, I have shown on the accompanying sheets of drawings, for purposes of illustration, one practical embodiment thereof, which I will now describe.

Figure 10ª and Figure 10ᵇ are enlarged views of details;

Figure 8:
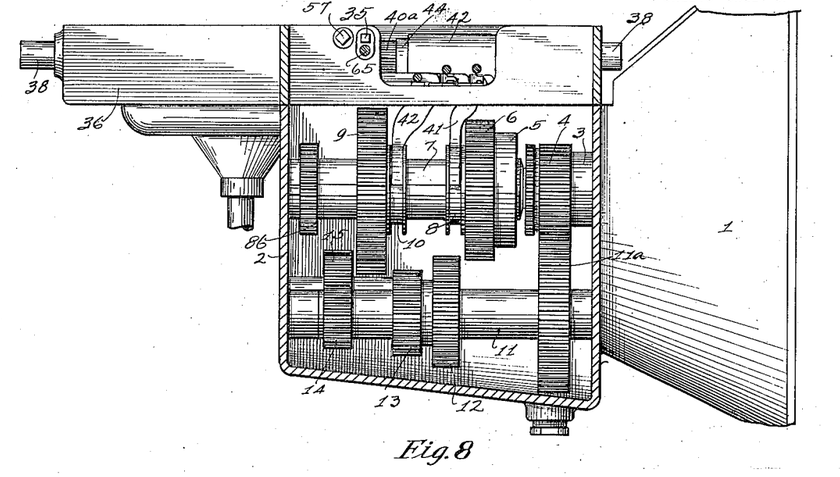
Figure 8 is a vertical sectional view through the casing, on line 8—8 of Fig. 9, showing the usual transmission gears in neutral positions.

Referring in detail to the drawings, my invention comprises a casing for the clutch and transmission mechanism which is very similar to that in common use, with certain extensions formed therein to receive the additional mechanisms constituting my invention. In the drawings, 1 designates the clutch casing, and 2 the transmission housing. Referring to Fig. 8, 3 designates the usual clutch driving shaft, 4 the clutch gear, 5 an internal gear adapted to be moved over the clutch gear 4 for direct drive, and 6 a gear for intermediate drive. Gears 5 and 6 constitute a single element slidably mounted on a square shaft 7, adapted to be locked to the clutch shaft 3, and to turn therewith, when the internal gear 5 is shifted over clutch gear 4. Secured to the gear 6, is a shifting collar 8, by means of which said gears 5 and 6 are moved in opposite directions. Also slidably mounted on the square shaft 7, is a gear 9, having a shifting collar 10. Also mounted in said transmission casing is a counter shaft 11, provided with a gear 11ª secured thereto, and constantly in mesh with the clutch gear 4. Also mounted on said counter shaft 11, are three transmission gears 12, 13 and 14. 15 designates the usual idler gear for reversing the drive. As this mechanism is well known, its operation need not be further described.

Figures 4, 5, 6:
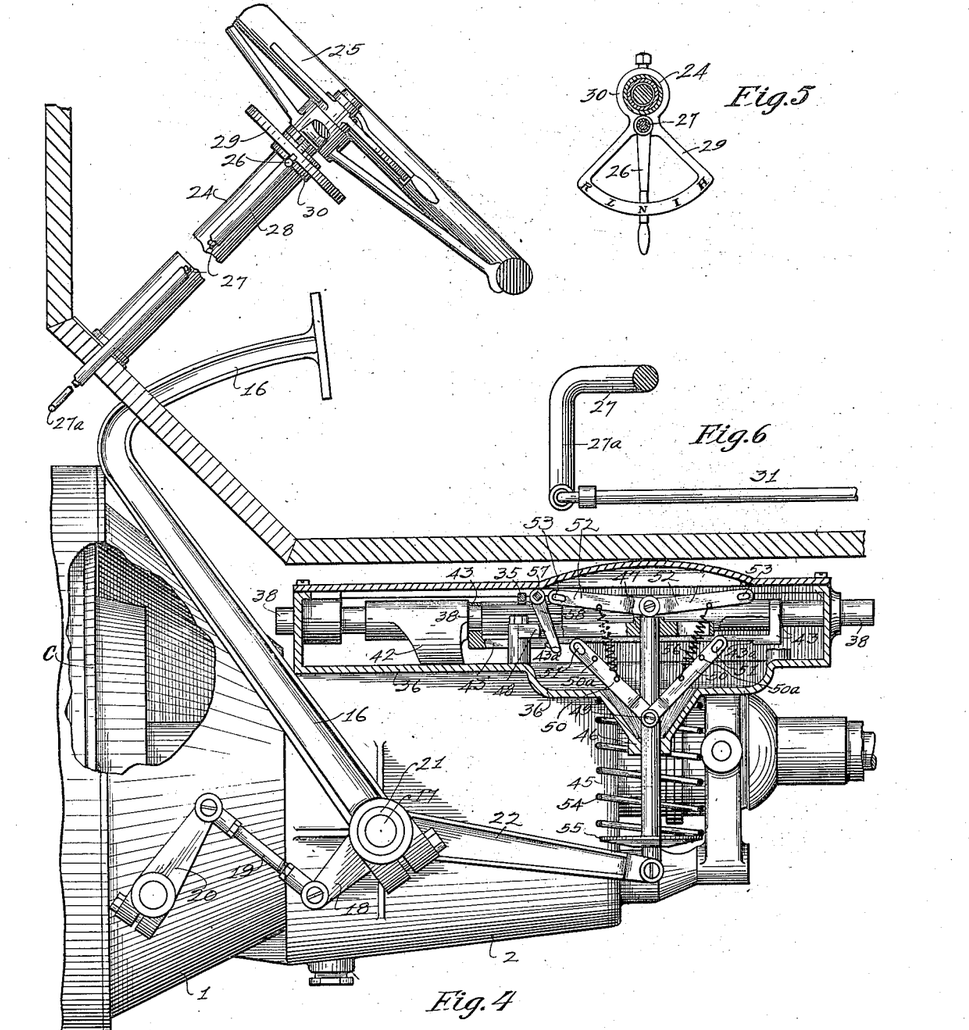
Figure 4 is a side elevation of my invention with parts broken away and parts in section.
Figure 5 is a plan view of a selector element.
Figure 6 is an enlarged view of a detail.

Referring now to Fig. 4, the usual clutch lever 16, is mounted on the usual shaft 17, in the casing 2, for operating the clutch through the connecting elements 18, 19 and 20. The clutch lever 16, is secured to the end of the sleeve 21 mounted on said shaft 17, as clearly shown in Figs. 10 and 11. Said sleeve 21, at its inner end, is cut away for one-half of its circumference, as indicated at 21ª. Also mounted on the shaft 17, at the inner end of said sleeve 21, is an arm 22, provided with a sleeve 23, also cut away to overlap the projecting end of the sleeve 21, as shown at 21ª in Fig. 10. The overlapping portions, however, of the sleeve 21, and of the sleeve 23, on said shaft 17, do not complete the full circumference of said sleeves, but are so arranged that there is a certain amount of lost turning motion on the shaft 17, in order that the clutch lever 16, may be depressed sufficiently to release the clutch before the projecting sleeve portion 21ª, thereof, engages the projecting portion of the sleeve 23, in such a way as to move the arm 22. The function of this arm 22, will be referred to more fully further on in this description.

Referring further to Fig. 4, I have mounted on the steering post 24, under the steering wheel 25, an operating member or lever 26, mounted on the upper end of an operating rod 27, extending through a tubular casing 28. Said operating member or lever 26, is associated with a quadrant 29, secured to the steering post 24, as at 30. Said quadrant is provided with five indicating positions, or as many as may be required, there being shown, "R"—reverse, "L"—low, "N"—neutral, "I"—intermediate, and "H"—high. The operating member or lever 26, is shown at neutral position in Fig. 5. This simple mechanism is operated to determine which of the transmission connections (low, intermediate, high, or reverse) is to be made.

The lower end of the operating rod 27, is bent at an angle, as at 27ª, more clearly shown in Fig. 6, to the end of which angle is connected an operating rod 31.

Figures 1, 2, 3:
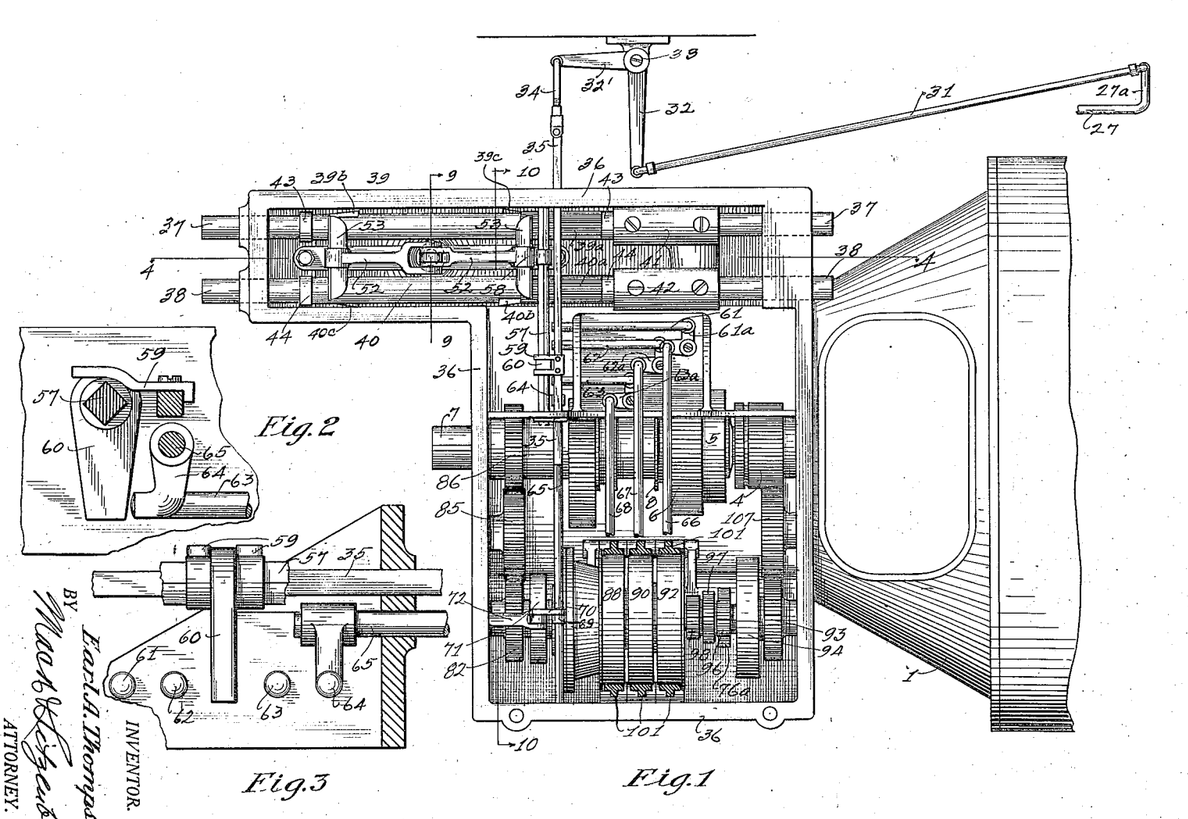
Figure 1 is a top plan view of one embodiment of my invention.
Figures 2 and 3 are enlarged views of details.

Referring now to Fig. 1, it will be seen that the opposite end of said rod 31, is connected to a bell crank 32, supported in a bracket 33, secured to the frame of the vehicle. The other arm 32′ of the bell crank 32, is adjustably connected by means of a link 34, to a rack bar 35, adapted to be moved longitudinally different distances by the movement of the selector lever 26.

Figures 9, 10, 10A, 10B, 11:
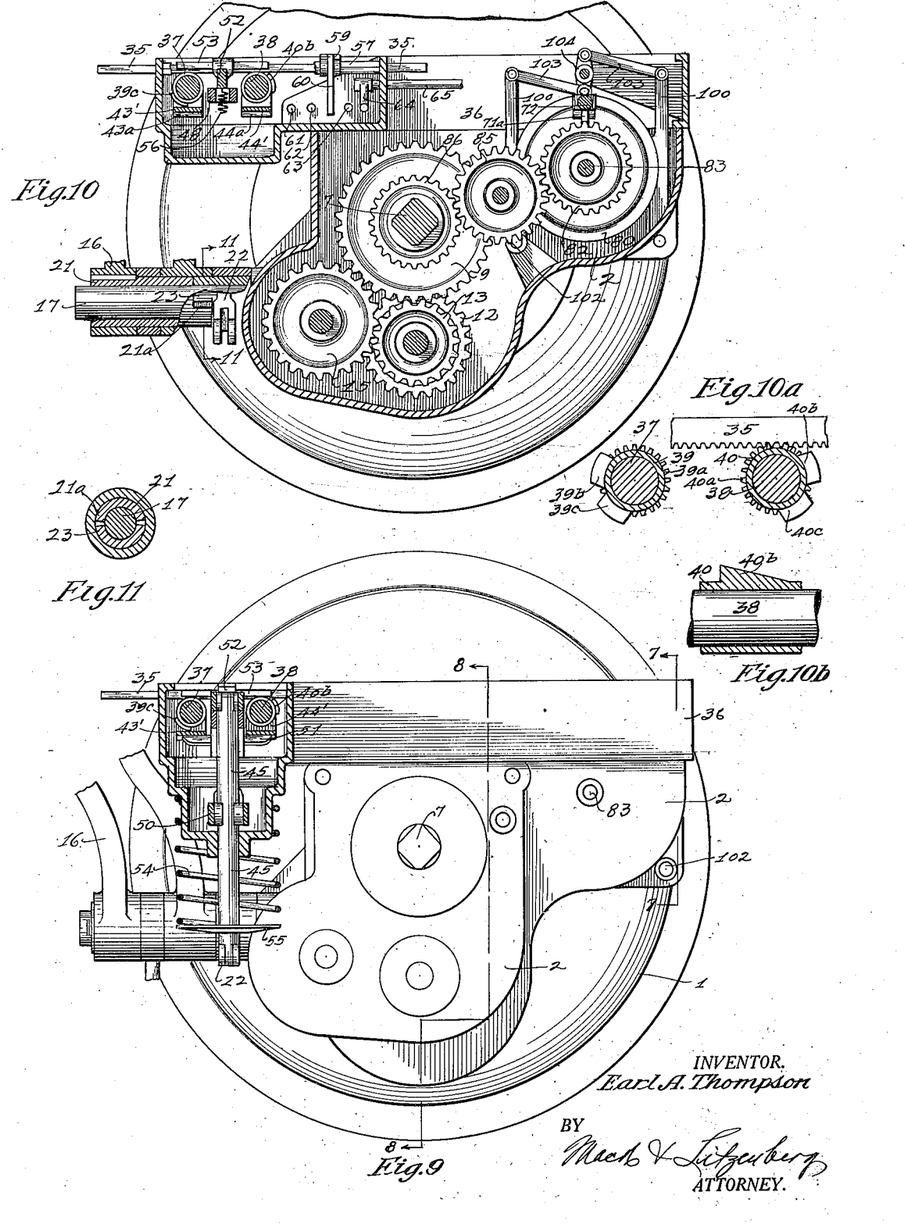
Figure 9 is a rear elevation of the casing with a part in section taken on line 9—9 if Fig. 1.
Figure 10 is a vertical sectional view taken on line 10—10 of Fig. 1.
Figure 11 is a sectional view taken on line 11—11 of Fig. 10.

I will next describe the mechanism by means of which the transmission gears to be moved into mesh with each other are selected. Referring to Figs. 1, 9 and 10, the rack bar 35, is slidably mounted through the upper portion of an upper casing 36, mounted on top of the transmission casing 2, Fig. 1, the cover of this upper casing being removed. Slidably mounted through said upper casing 36, are two parallel shafts 37 and 38. Rotatably mounted on said shafts 37 and 38, respectively, are two sleeves 39 and 40, the right hand end of said sleeves, as shown in Fig. 1, being provided with longitudinally extending gear teeth, 39ª and 40ª, adapted to mesh with said rack bar 35, whereby said sleeves 39 and 40, are rotated as said rack bar 35, is moved by the selector lever 26. The sleeve 39, is provided with operating lugs, 39$^b$ and 39$^c$ (see Fig. 10$^a$), differently positioned circumferentially of said sleeve, and adapted to act as moving elements for moving said sleeve 39, and its shaft 37, longitudinally in opposite directions in a manner hereinafter described. The sleeve 40, is also provided with similar lugs 40$^b$ and 40$^c$, for the same purpose. The shafts 37 and 38, are operated in a manner, hereinafter described for the purpose of shifting the selected transmission gears, and to this end, said shafts are provided, respectively, with shifter forks 41 and 42, the forks of which extend downwardly for engaging respectively, with the shifting collars 8 and 10, of gears 6 and 9, as seen in Fig. 8. The shafts 37 and 38, are also provided with yoke members 43 and 44, respectively, each comprising a pair of collars at the opposite ends of its sleeve 39 or 40, as seen clearly in Figs. 1, 4 and 10, which collars are connected below the sleeve, 39 or 40, by means of connecting portions, 43′ and 44′. The connecting portions are cut away to form shoulders, as at 43$^a$, 43$^a$, and 44$^a$, 44$^a$, Fig. 4, for a purpose hereinafter described. The yoke members 43 and 44 are secured to the shafts 37 and 38, so that when said yokes are moved, the sleeves within the yokes, and the shafts must move therewith.

I will next describe the connections from the arm 22, which is operated by the clutch lever 16, for moving the shafts 37 and 38, together with the shifter forks mounted thereon. Referring to Fig. 4, a vertical operating shaft 45, is operatively connected at its lower end to the end of the arm 22, and passes through a bearing at 46, in the casing 36, and through a bearing 47, in a bracket 48, mounted in the casing 36. Pivotally connected to said shaft 45, as at 49, are two toggle arms 50, 50, the upper ends of which are provided with cross members 51, 51, adapted to engage the shoulders 43$^a$, 43$^a$, and 44$^a$, 44$^a$, on the under sides of the yoke members 43 and 44, for the purpose of moving said yoke members, together with the shafts 37 and 38, to neutral positions when said arm 22, and the operating shaft 45 are raised. Pivotally secured to the upper end of the shaft 45, are two toggle arms 52, 52, also provided in their outer ends with cross bars 53, 53, adapted to slide upon the upper sides of the sleeves 39 and 40, and to engage whichever lug on said sleeves 39 and 40 is turned uppermost by the shifting rack 35, operated by the selector lever 26.

It will, therefore, be seen from the mechanism thus far described that the shifting of the selector lever 26, through the connections hereinbefore described, turns the sleeves 39 and 40, on the shafts 37 and 38, so as to bring uppermost the proper lug on sleeve 39 and 40, as the case may be, to be engaged by one or the other of the cross bars 52, 53; also, that when the clutch lever 16, is depressed, its initial movement disconnects the clutch, C, while the continued movement thereof lifts the arm 22, the shaft 45, and raises the toggle arms 50, 50, on the under side of the yokes 43 and 44, so as to move said yokes to their neutral positions, which operate to move the shafts 37 and 38, in such a way as to disengage whichever of the transmission gears may be in mesh with each other. Therefore, the simple depression of the clutch lever 16, also operates to disengage the transmission gears, which were operating prior to the depression of the clutch lever. The clutch lever is returned, and the arm 22, depressed by means of a spring 54, around the shaft 45, and seated at its lower end upon a bearing plate 55, and at its upper end bearing against the under side of the casing 36, as clearly shown in Fig. 4. As the clutch lever 16, returns and said arm 22 moves downwardly, together with the shaft 45, under the tension of the spring 54, the upper toggle arms 52, 52, having been raised so that one of the cross bars 53, 53, thereof, will be in position to engage one of the lugs on one of the sleeves, 39 or 40, which has been turned uppermost by the operation of the selector lever 26, and will thus move one of said shafts 37 or 38, as the case may be, as hereinbefore described, for the purpose of shifting the gear previously selected by the operation of the selector lever 26. The upper toggle arms 52, 52, are yieldingly connected with the lower toggle arms 50, 50, by means of coiled springs 56, 56, which operate to hold the upper toggles arms down on the sleeves 39 or 40, and the lower toggle arms up against the lower sides of the yokes 43 and 44.

Figure 7:
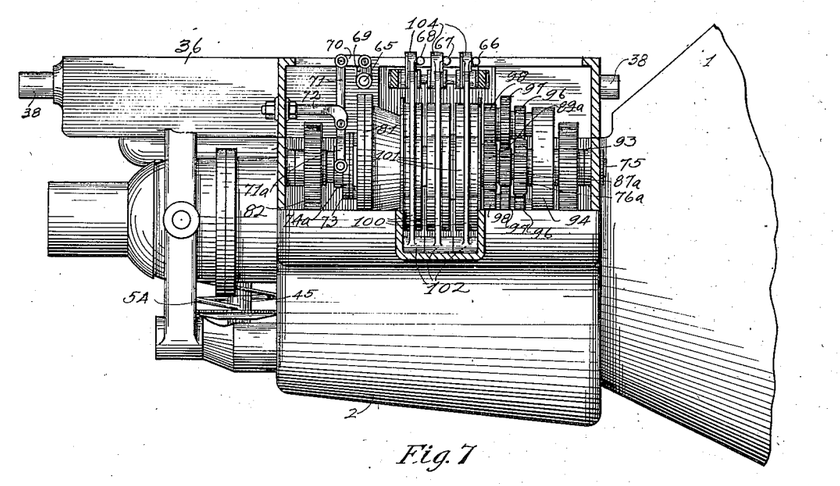
Figure 7 is a side elevation of the main casing, with the upper part thereof cut away to show my synchronizing mechanism.
Figures 12, 13, 14:
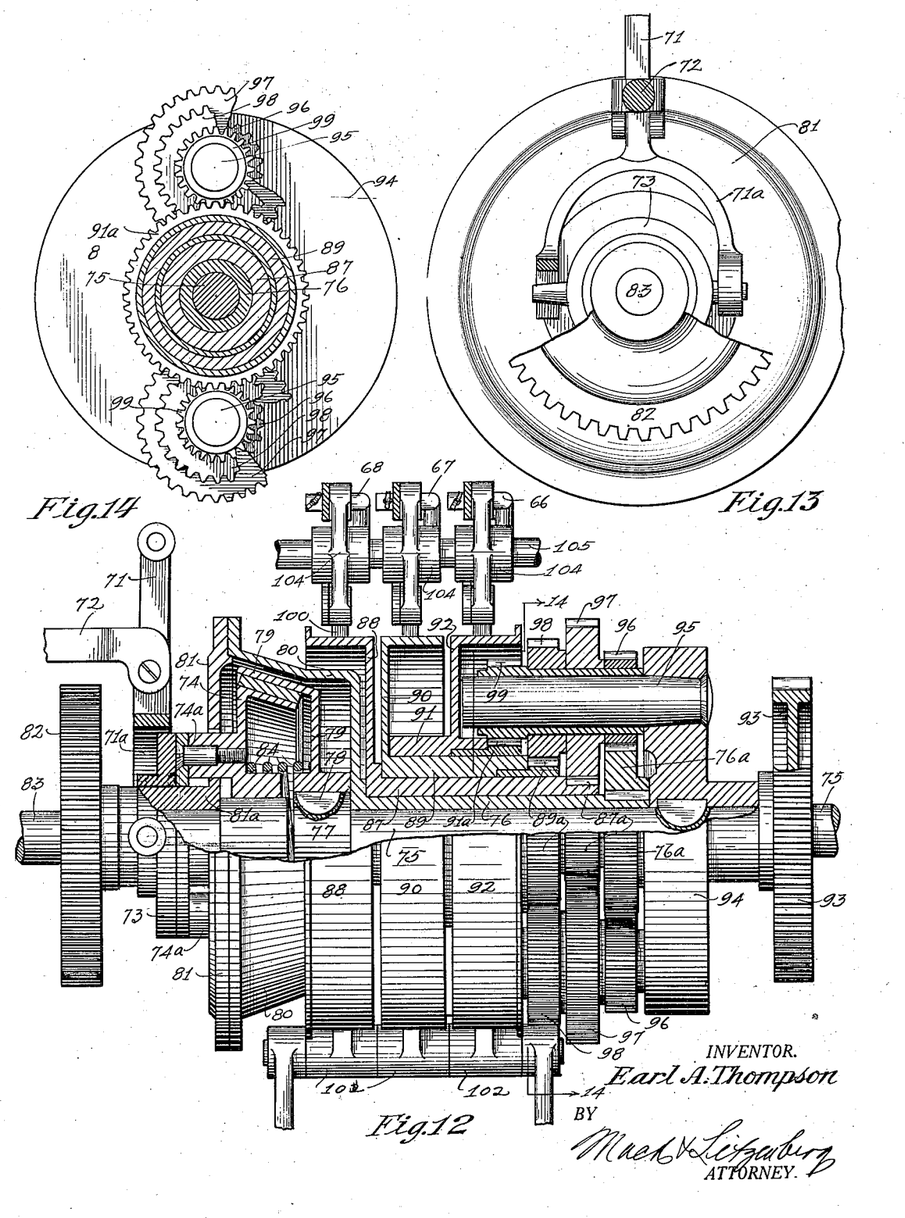
Figure 12 is a side elevation of my synchronizing mechanism, partially in section.
Figure 13 is an end elevation, from the left-hand end of Fig. 12.
Figure 14 is a sectional view taken on line 14—14 of Fig. 12.

Referring to Figs. 1, 2, 3 and 4 there is mounted along side of the rack bar 35, in the casing 36, a square shaft 57, provided with a downwardly depending finger 58, adapted to be engaged by one of the neutralizing toggle arms 50, with each depression of the clutch member 16, for the purpose of rocking said square shaft 57. Secured to the rack bar 35, is a shifting yoke 59, shown in Figs. 1, 2 and 3, which engages a downwardly depending finger 60, slidably mounted on the square shaft 57, for the purpose of moving said finger on said shaft to different positions, according to the distance the rack bar 35, may be shifted in the operation of the selector lever 26. Said finger 60, is movable on said shaft 57, from its neutral position, as shown in Fig. 3, in either direction and to positions adapted to register with the ends of three push rods, 61, 62 and 63, or to register with a crank 64, mounted on a rod 65, directly beneath the rack 35, as shown in Figs. 1, 2 and 3. When either of the push rods 61, 62, or 63, is operated, according to the position of the operating finger, 60, controlled by the crank 35, it operates bell crank 61ª, 62ª, or 63ª, which bell cranks are also connected, respectively, with operating or pull rods 66, 67 and 68, while the rods 65, operated by the crank 64, at its opposite end is provided with an upwardly projecting crank arm 69, which is connected by means of a link 70, to the upper end of a rocker lever 71, shown in Fig. 7, which is pivoted intermediate its ends to a bracket 72 and the lower end of which is pivotally connected to a clutch thrust member 73, of a clutch element 74, the latter of which is shown in Fig. 12, which clutch is operated for a purpose hereinafter again referred to.

I will now describe the mechanism for synchronizing or co-ordinating the speeds of the transmission gears which are to be moved into mesh with each other, in order to facilitate the operation of shifting said gears into mesh with each other while they are running.

Referring now particularly to Figs. 1, 10, 12, 15 and 16, the synchronizing mechanism is mounted in the casing 2, and comprises a shaft 75, which extends through a sleeve 76, and is provided at its enlarged end 77, with a clutch element 79, keyed thereto as at 78. The sleeve 76, through which said shaft 75 extends, is provided at its inner end with a bell shaped drum 80, said drum being closed at its outer end with a driving plate 81, secured thereto around its circumference in any suitable manner. Said driving plate 81, has a hub-like portion 81ª, on which is mounted a driving gear 82, said hub-like portion 81ª, and said drive gear 82, being supported on a short shaft 83, in alinement with the shaft 75, and adapted to be locked thereto, by means of the clutch element 74, engaging with the clutch element 79. Said clutch element 74, is operated by a thrust member 73, with which is connected an operating yoke 71ª, on the lower end of the rocker lever 71, as clearly shown in Figs. 12 and 13, thus making it possible by the operation of said lever 71, to engage the clutch element 74, with the clutch element 79, and thereby lock together for direct drive, the gear 82, drive plate 81, and the shaft 75. The clutch element 74, is normally held out of engagement with the clutch element 79, by means of a coiled spring 84, mounted therein. It will be noted from Fig. 12, that the clutch element 74, has bosses 74ª, 74ª, which project through openings in the drive plate 81, and by means of which it is moved.

The gear 82, as seen more clearly in Fig. 1, meshes with an idler 85, mounted in the casing 2, which idler meshes with a gear 86, mounted on the square shaft 7. Attention is called to the fact that this end of the shaft 7, is connected with the drive shaft of the vehicle, and would, therefore, be driven by the movement of the vehicle, and not from the clutch gear 4. When the clutch element 74, is in its normal position, it is turned independently of the clutch element 79, by the drive plate 81, driven by the gear 82, the bell-shaped drum 80, and its sleeve 76, turning therewith on the shaft 75. When the clutch 74, is shifted into engagement with the element 79, the shaft 75 is driven therewith from the gear 82. Mounted to turn on the sleeve 76, is a sleeve 87, provided with a drum 88, which partially overlies the bell-shaped drum 80. Mounted to turn on the sleeve 87, is a sleeve 89, provided on its end with a drum 90. Mounted on the sleeve 89, is a sleeve 91, which lies partially within the drum 90, and is provided with a drum 92. The drums 88, 90 and 92, are substantially of the same diameter, as will be clear from Fig. 12. Keyed to the outer end of the sleeve 76, is a gear 76ª. On the outer end of the sleeve 87, is a gear 87ª approximately of the same diameter as the sleeve itself. On the end of the sleeve 89, is a similar gear 89ª, and on the sleeve 91, is another similar gear 91ª. Mounted on the shaft 75, is a gear 93, to which is secured a disc 94, provided at diametrically opposite sides with the bearing pins 95, 95, Fig. 14. Mounted on the bearing pins 95, 95, is a cluster of gears 96, 97, 98 and 99. The gear 96, meshes with the gear 76ª, on the end of the sleeve 76. The gear 97, meshes with the gear 87ª, on the sleeve 87. The gear 98, meshes with the gear 89ª, on the sleeve 89, and the gear 99, meshes with the gear 91ª, on the sleeve 91.

Figure 15:
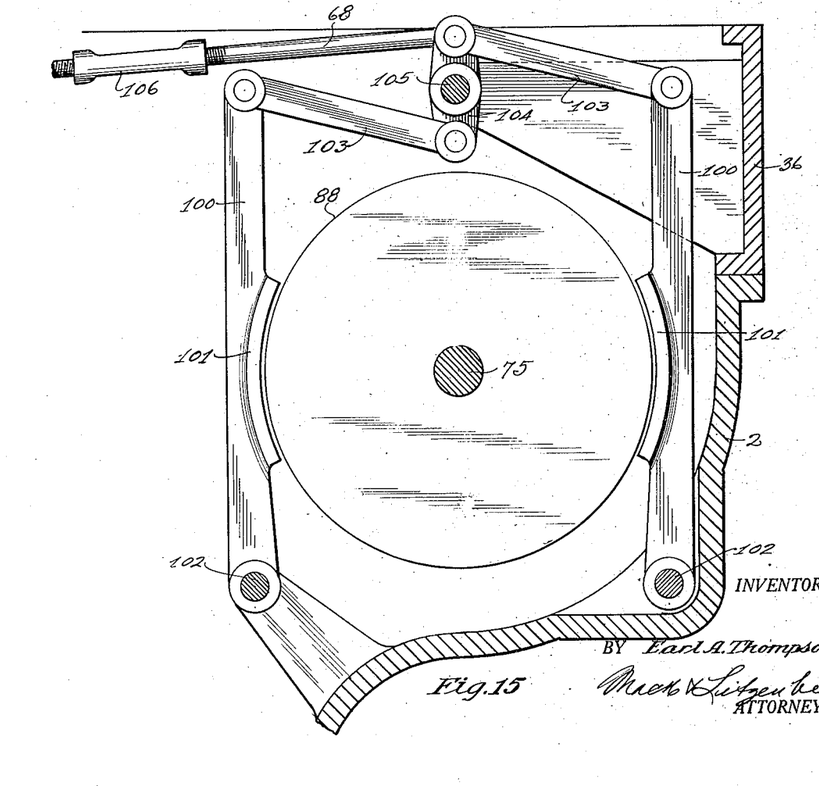
Figure 15 is a partial section view through the synchronizing mechanism shown in Fig. 12, showing an end elevation of one of the holding drums and its braking mechanism.
Figure 16:
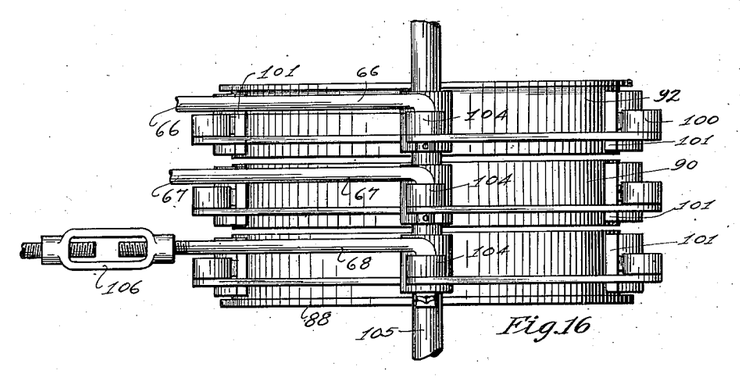
Figure 16 is a top plan view of the holding drums and their braking mechanisms.

In order to hold either of the drums 88, 90, or 92, a brake mechanism is provided for each, clearly shown in end elevation in Fig. 15, and top plan view in Fig. 16, and each comprising a pair of brake levers, 100, 100, provided with brake shoes 101, 101, said brake levers being pivotally connected at their lower ends, as at 102, 102, and at their upper ends connected by means of links 103, 103, with a rocker arm 104, pivoted intermediate its ends at 105. Said rocker arms 104, are connected, respectively, with the pull rods 68, 67 and 66, by means of turn buckles, as at 106. Thus the operating mechanisms for the brake shoes 101, 101, are connected through the pull rods 66, 67 and 68, and their connections, hereinbefore described, for operation by the push rods 61, 62 and 63, which are selectively operated by the finger 60, the position of which is controlled by the position of the rack bar 35, which is controlled from the selector lever 26. Therefore, when the selector lever 26, is moved to one or its selecting positions, it operates through its connections to set mechanism for operating the brake shoes on one of the drums 88, 90, or 92, whereby to hold the selected drum from rotating. When a direct drive, or a high speed, selection is made, the rack 35, is so moved that the finger 60, thereon operates on the crank 64, to rock the rod 65, and its connections for engaging the clutch elements 74 and 79, as hereinbefore described.

I will now describe in detail the operation of the synchronizing mechanism, by means of which the gears selected to be moved into mesh with each other are synchronized from the speed of the vehicle, referring more particularly to Figs. 1, 12, 7 and 8.

Assuming that the vehicle is moving, the gear 82, is being driven from the shaft 7, through the gear 86, and the idler 85, which is in mesh with said gear 82. From the gear 82, the drive plate 81, the bell-shaped drum 80, with its sleeve 76, and its gear 76$^a$, on the other end thereof, are all being driven. So long as none of the drums 88, 90 or 92, is not held from turning, these drums, and the planetary gears 96, 97, 98 and 99, are driven through the connection of the gear 76$^a$, with the gears 96, on the bearing pins 95, in the disc 94, and are free to assume the speed and direction thus transmitted through said sleeve 76, and its gear 76$^a$.

Assuming now that it is desired to mesh the intermediate speed gears 6 and 12, Fig. 8, the selector lever 26, is moved to this position, which movement operates through the connections from said selector lever 26, to move the rack bar 35 for the purpose of turning the sleeves 39 and 40, to bring uppermost the lug 39$^b$ for engagement with one of the toggle cross bars 53. This movement also positions the operating finger 60 opposite the push rod 63, through which the brake on drum 88 is applied. As said clutch lever is now depressed, it first disengages its clutch C, and then, through the arm 22, operates the toggles 50, 50, which, in turn, moves the yoke 43 or 44 which is out of neutral position, into neutral position for the purpose of moving the transmission gear then operating into neutral position. Said depression of the clutch lever also causes one of the toggle arms 50 to engage and rock the finger 58, which operates to rock the shaft 57 and finger 60 for the purpose of supplying the brake to the drum 88. This operates to hold drum 88, together with its sleeve 87, and its gear 87$^a$, from turning.

The toggle arms 50, 50, are provided with pins 50$^a$, 50$^a$, as shown in Fig. 4, which engage the lower sides of the yokes 43' and 44', as said toggles are moved to their uppermost positions, said pins acting as fulcrums for the purpose of moving the cross bars 51, 51, thereof, out of engagement with the shoulders 43$^a$, 43$^a$, of said yoke, whereby to permit the upper toggles 52, 32, to be operated in order to move the shaft 37 or 38, in shifting the gears selected to be moved into mesh with each other.

It will be remembered that the vehicle is moving and that the gear 82, drum 80, its sleeve 76, and its gear 76$^a$, are being turned by the movement of the vehicle according to the speed of the vehicle. As the gear 87$^a$, is thus held from turning, and the gear 76$^a$, is being driven by the movement of the vehicle, it will be evident that the gears 96, 97, 98, and 99, which turn as a unit, will be driven from said gear 76$^a$, and, inasmuch as gear 97 is in mesh with gear 87$^a$, which is being held, gear 97, must travel around the gear 87$^a$, and carry with it the disc 94, and the bearing pins 95, mounted therein. This movement of the disc 94 will be determined by the speed of the vehicle being transmitted through small gear 76$^a$, and gear 96, and gear 98 in mesh with the small gear 87$^a$, which is being held stationary. This speed is transmitted from the disc 94 to the gear 93, driven therewith and then to the idler gear 107, in mesh with the clutch gear 4, shown in Fig. 1. As the clutch is out of engagement, the clutch gear 4, is driven thereby, and drives gear 11$^a$ on the counter shaft 11, and the gear 12, with which it is desired to move the gear 6 into mesh. It will be remembered that gear 6 and the shaft 7 are being driven by the movement of the vehicle. The gear 12 has been given a pitch like velocity, substantially the same as gear 6, so that as the clutch lever 16 returns, and the toggles 52, 52, operate the gear shifting shaft 37, in a manner hereinbefore described, said gear 6 will be moved into mesh with gear 12, and the intermediate driving speed thus established. The machine is now being driven at the intermediate speed. If it is desired to shift the gears to the high speed, the operation is accomplished in a similar manner. The selector lever 26, is moved to the high position, during which the rack bar 35 turns the sleeve 39, on the shaft 37, to bring lug 39$^c$, on the opposite end thereof, to the uppermost position, and in position to be engaged by the cross bar 53, on the toggle arm 52, as shown in Fig. 1. Said lug 39$^c$ is not seen on this Figure, but is seen in Fig. 10$^a$. The finger 60 is also moved by the movement of said rack bar 35, to a position opposite the crank 64, for rocking shaft 65. When the clutch lever 16 is depressed, the gears which are in mesh are disconnected by the operation of the toggle arms 50, 50, and the finger 58 on the shaft 57 is rocked, which operates to move the finger 60 for the purpose of rocking shaft 65, for engaging the clutch elements 74 and 79, as will be clear from Figs. 7 and 12, thus making a direct drive from the movement of the vehicle through the gear 82, the clutch members 74 and 79, and the drive shaft 75, to the gear 93, and thence to the clutch gear 4, with which the internal gear 5, is to be moved into mesh. This is easily accomplished for the reason that the shaft 7, and the gear 5, and also clutch 4, are being driven at substantially the same speed. The other gear shifts are accomplished in the same manner, and while it is even possible to throw the reverse gears into mesh with each other while the vehicle is traveling forwardly, it is evident, of course, that great care must be exercised, and the clutch be allowed to move very gradually into engagement, which will then operate as a brake in bringing the machine to a stop and immediately reversing the direction of travel without further change.

It will be understood, of course, when the reverse drive is desired, the selector lever 26 is moved as before described and the mechanisms operated so as to hold drum 92 from turning. It will be also understood that in order to accomplish a reverse connection of the transmission gears, that the clutch gear 4, must be temporarily reversed in its direction of movement. This is accomplished when drum 92 is held, by the following connections: Referring to Fig. 12, it will be remembered that gear 82 is being driven by the forward movement of the vehicle and is traveling in the same direction as is the clutch gear 4. Gear 82 is driving drum 80, its sleeve 76, and is, therefore, driving the cluster of gears, 96, 97, 98 and 99. The gear 99 is in mesh with gear 91ª, which is being held with the drum 92. Because of the relative sizes of gear 91ª and gear 99, in mesh with each other, and of gears 96 and 76ª, also in mesh with each other, Figs. 12 and 14, it will be seen that gear 76ª, is driving gears 96 and 99, together around the pin 95, and because of the fact that gear 99 is in mesh with the large gear 91ª, which is being held with the drum 92, gear 99, together with its pin 95, must necessarily move around said gear 91ª, and carry with it the pin 95, the gear 91ª, and carry with it the pin 95, the disc 94, and gear 93, around the axis of the shaft 75, in a direction opposite to that of the gear 76ª. It will, therefore, be seen that the drive from said gear 93, through the idler 107, to the clutch gear 4, will drive said clutch gear 4, in a direction opposite to that of the drive shaft 7, on which is mounted sliding gear 9, which must be moved into mesh with the reverse idler, 15, in mesh with gear 14, on counter shaft 11. Said idler gear 15, is, therefore, given a direction and speed of travel from the clutch gear, 4, which corresponds to that of gear 9, being driven by the movement of the vehicle, and gear 9 can be readily moved into mesh with said idler. If the clutch is very carefully allowed to engage, it gradually brings the clutch gear, 4, to a stop and immediately reverses the direction thereof, thereby reversing the direction of travel of the vehicle.

While I have shown and described one practical embodiment of my invention, I am aware that changes can be made in the general arrangements of the various mechanisms shown in cooperating combination with each other, and that many changes can be made in the details of construction and arrangement of parts, without departing from the spirit of my invention, and I do not, therefore, limit my invention to the details, or the particular arrangement shown and described, except as I may be limited by the hereto appended claims. For example I will employ in some of the claims the general term "lever and link mechanism" associated with certain of the parts to be operated, meaning thereby to embrace the pedal or the like and any suitable mechanical operating connection between the same and the related parts as distinguished, for instance, from simple wiring of an electrical circuit.

I claim:

1. In a power transmission having a clutch, a clutch operating element, and transmission gears, means for successively releasing the clutch, shifting the gears and synchronizing the speed of the gears during movement of the operating element from its normal position, and means for successively shifting the gears and engaging the clutch during the movement of the operating element in returning to its normal position.

2. In a power transmission having a clutch, a clutch operating element and transmission gears adapted to be brought into or out of mesh, means for selecting the gears to be meshed, and independent means for successively releasing the clutch, shifting the gears and synchronizing the speed of the gears by a movement of the operating element in one direction and for successively shifting the gears and engaging the clutch upon the movement of the operating element in the opposite direction.

3. The combination with the shiftable gears of a power transmission mechanism, a clutch and a clutch operating pedal, of a mechanically operated synchronizing mechanism adapted to synchronize the speeds of the gears to be shifted into mesh with each other, said synchronizing mechanism being automatically controlled and set into action by the depression of the clutch pedal, and means connected with said clutch pedal for automatically shifting the synchronized gears into mesh with each other as said pedal returns after being depressed.

4. The combination with the shiftable gears of a power transmission mechanism, a clutch and a clutch pedal, of a pre-selecting mechanism for determining the gears to be shifted into mesh with each other, a mechanically operated synchronizing mechanism adapted to synchronize the speeds of the gears to be shifted into mesh with each other, means controlled automatically by said clutch pedal for setting said synchronizing mechanism into operation on the gears preselected, said mechanism being set into operation by the depression of said clutch pedal, and means connected with and operated by said clutch pedal for shifting the pre-selected and synchronized gears into mesh with each other as said clutch pedal returns to its raised position, substantially as described.

5. In combination, a clutch mechanism, a transmission mechanism, a synchronizing mechanism, a pre-selector mechanism, a gear shifting mechanism, and means for operating said gear shifting mechanism, said means causing said synchronizing mechanism to operate.

6. In combination, gears of varying sizes adapted to be moved into and out of mesh with each other, a synchronizing mechanism for synchronizing the speed of the gears selected, a gear shifting mechanism and a pre-selecting mechanism common to said synchronizing mechanism and said gear shifting mechanism.

7. In combination, gears of varying sizes adapted to be moved into and out of mesh with each other, a pre-selector mechanism for selecting the gears to be moved together, a synchronizing mechanism for synchronizing the speeds of the gears selected, and gear shifting mechanism adapted for shifting said gears and causing the operation of said synchronizing mechanism.

8. In combination, clutch mechanism, gear shifting mechanism, gear synchronizing mechanism, and manually operable lever and link mechanism common to all for operating said clutch mechanism, said gear shifting mechanism, and for causing the operation of said gear synchronizing mechanism.

9. In combination, clutch mechanism, gear shifting mechanism, gear selecting mechanism and means for operating the same, gear synchronizing mechanism, and manually operable lever and link mechanism common to said clutch mechanism, said gear shifting mechanism and said gear synchronizing mechanism for operating and causing their operation in proper sequence.

10. In combination, a driving element, a driven element, gears thereon adapted to be moved into and out of mesh with each other, means for coordinating the speeds of said gears before they are moved into mesh with each other, an operating lever for moving said gears out of mesh with each other, operating connections from said lever for causing the operation of the means for coordinating the speeds of said gears as said lever is moved in one direction, and operating connections from said lever for automatically moving the coordinated gears into mesh with each other as said lever moves in the opposite direction.

11. In combination, a driving element, a driven element, gears thereon adapted to be moved into and out of mesh with each other, an operating lever for moving said gears, means for coordinating the speeds of the gears to be moved into mesh with each other, said means being set in operation by the movement of said lever in one direction to disengage gears in mesh with each other, and means whereby the movement of said lever in the opposite direction operates to move gears whose speeds have been coordinated into mesh with each other, substanially as described.

12. In combination, a driving element, a driven element, gears on said elements adapted to be moved into and out of mesh with each other, an operating lever for moving said gears, operating connections whereby the movement of said lever in one direction disengages gears already in mesh with each other, means for coordinating the speeds of gears to be moved into mesh with each other, means for previously selecting said gears, said coordinating means being set into operation by the movement of said lever to disengage gears in mesh with each other, and operating connections with said lever for automatically moving the coordinated gears into mesh with each other as said lever is moved in the opposite direction, substantially as described.

13. In an automobile, in combination with the transmission gears and clutch pedal thereof, a gear synchronizing mechanism adapted to be automatically controlled from said clutch pedal when the pedal is operated in one direction, and operating connections from said clutch pedal for automatically shifting the gears whose speeds have been synchronized into mesh with each other with the movement of said clutch pedal in the opposite direction.

14. In an automobile, in combination with the transmission gears and clutch pedal thereof, a synchronizing mechanism adapted to be automatically controlled from said clutch pedal for synchronizing the speeds of gears to be moved into mesh with each other, a pre-selecting mechanism common to said gears and said synchronizing mechanism for previously selecting the gears to be synchronized and moved, and operating connections from said clutch pedal for automatically shifting the gears whose speed have been synchronized into mesh with each other with the return movement of said clutch pedal.

15. In an automobile, in combination with the clutch, clutch pedal, transmission gears and driving connections to the rear axle of said automobile, of a gear synchronizing mechanism and means controlled from the clutch pedal during the clutch releasing movement for operating said synchronizing mechanism from said rear axle for synchronizing the speeds of the gears to be moved into mesh with each other, and means operated directly by said clutch pedal for automatically moving said synchronized gears into mesh with each other.

16. In a motor vehicle, the combination with the clutch mechanism and clutch pedal for operating the same, and transmission gears, of a gear selecting mechanism, means for operating the same, gear synchronizing mechanism adapted to be operated by the movement of the vehicle, and operating connections from said clutch pedal for successively disengaging the clutch and the transmission gears already in mesh when said pedal is depressed and for causing the gear synchronizing mechanism to operate, and connections for moving the selected gears into mesh with each other and again engaging said clutch when said clutch pedal is returned to its normal position, substantially as described.

17. In combination with gears adapted to be moved into and out of mesh with each other, a synchronizing mechanism comprising in combination, a clutch, an epicyclic gear train, and means for holding certain of said gears whereby to produce various speed transmissions therefrom.

18. In a device of the character referred to, a plurality of gears adapted to be moved into and out of mesh with each other, a mechanically operated synchronizing mechanism for automatically synchronizing the speeds of the gears to be moved into mesh with each other whereby to facilitate their intermeshing, means for moving said gears out of mesh with each other, said means causing the operation of said synchronizing mechanism during its initial movement, and means whereby the return movement of said gear moving means operates to automatically move into mesh with each other the gears whose speeds have been synchronized.

19. In combination with gears adapted to be moved into and out of mesh with each other, a synchronizing mechanism comprising in combination, an epicyclic gear train, and means for holding certain of said gears whereby to produce various speed transmissions therefrom.

20. In combination with gears to be shifted, shifting members to move therewith, connections therefrom to said gears, and means for moving said shifting members in opposite directions comprising a set of toggles above and a set of toggles below, and a transverse operating member connected with said toggles for operating them in opposite directions.

21. In combination with gears mounted to be shifted, shifting members to move therewith, connections therefrom to said gears, a clutch pedal, an operating member connected to be operated by said clutch pedal upper and lower sets of toggles connected at their ends to said operating member and at their opposite ends to said shifting members, whereby to be operated in opposite directions on said shifting members, substantially as described.

22. In combination with gear shifting, parallel bars, means for shifting said bars in opposite directions comprising a set of toggle members above the same and a set of toggle members below the same, a transversely moving member connected to one end of each of said toggle members, the opposite ends of said toggle members being connected for moving said shifting bars, and a lever for operating said transversely moving member.

23. In a device of the character referred to, gears adapted to be moved into and out of mesh with each other, an operating lever, shifting elements adapted to be moved in opposite directions, toggle elements above and below said shifting elements for moving the same, and connections from said operating lever to said toggle elements, whereby the operation of said lever in opposite directions operates said shifting elements, substantially as described.

24. In a device of the character referred to, gears adapted to be moved into and out of mesh with each other, means for synchronizing the speeds of said gears, shifting elements adapted to be moved in opposite directions, connections therefrom to said gears, toggle elements connected with said shifting elements for moving the same, an operating lever, and operating connections from said lever to said toggle elements for operating the same, said operating lever functioning to move gears out of mesh as it is moved in one direction and functioning to move the gears whose speeds have been synchronized into mesh with each other as it is moved in the opposite direction, substantially as described.

Signed at Los Angeles, Los Angeles County, California, this 27th day of February, 1918.

EARL A. THOMPSON.

In presence of—
  W. R. LITZENBERG,
  D. P. KENDRICK.